United States Patent
Laederich et al.

(10) Patent No.: US 7,398,242 B2
(45) Date of Patent: Jul. 8, 2008

(54) RISK STRIPPING SYSTEM AND METHOD

(75) Inventors: Stephane Laederich, Zurich (CH); Peter Marty, Lachen (CH)

(73) Assignee: UBS AG, Zurich (CH)

(*) Notice: Subject to any disclaimer, the term of this patent is extended or adjusted under 35 U.S.C. 154(b) by 1153 days.

(21) Appl. No.: 09/891,183

(22) Filed: Jun. 25, 2001

(65) Prior Publication Data

US 2002/0198823 A1 Dec. 26, 2002

(51) Int. Cl.
*G06Q 40/00* (2006.01)
(52) U.S. Cl. .................. 705/36 R; 705/35; 705/37; 705/30; 705/33
(58) Field of Classification Search ............. 705/35–45, 705/30–34; 707/1–10, 200–206
See application file for complete search history.

(56) References Cited

U.S. PATENT DOCUMENTS 6,453,303 B1*  9/2002  Li ............................ 705/36 R
6,829,590 B1* 12/2004  Greener et al. ................ 705/38
2001/0027437 A1* 10/2001  Turbeville et al. ............. 705/38
2002/0099651 A1   7/2002  May
2002/0152156 A1* 10/2002  Tyson-Quah ................. 705/38

OTHER PUBLICATIONS

"Implementing Value at Risk", Philip Best, Chichester, England; New Yourk John Wiley & Sons, 1998, ISBN: 0471972053 (12 pages included: cover. 1-2, 27-29 & 103-109).*
"Implementing Value at Risk", Philip Best, Chichester, England; New Yourk John Wiley & Sons, 1998, ISBN: 0471972053 (2 pages included: cover + p. 13).*

* cited by examiner

*Primary Examiner*—Mary Cheung
*Assistant Examiner*—Kirsten S Apple
(74) *Attorney, Agent, or Firm*—Proskauer Rose LLP (57) ABSTRACT

A method is provided for managing risk associated with at least one financial transaction wherein each of the at least one financial transactions having at least a first risk factor and a second risk factor. The method includes a first step of receiving one of the at least one financial transactions. Next, in a second step, the first risk factor is transferred to a first risk book. The second risk factor is then transferred to a second risk book, in a third step. Next, in a fourth step, another of the at least one financial transactions is received. Finally, the second through fourth steps are repeated for each of the at least one financial transactions.

24 Claims, 5 Drawing Sheets

RISK STRIPPING SYSTEM AND METHOD

BACKGROUND

The following invention relates to a method and system for managing risk and, in particular, for precisely hedging the risks associated with a plurality of financial transactions.

Transactions involving financial instruments generally have associated therewith a number of risk factors. For example, a foreign exchange ("FX") forward transaction, in which there is an agreement to buy one currency against another currency at a specified future date at an agreed upon price, includes an interest rate risk factor (the absolute value of each currency may change) and an FX risk factor (the exchange rate may change by the future date). Other transaction types present different risk factors including, by way of non-limiting example, collateral risk, volatility risk individually as well as in various combinations.

Traders engaging in such transactions try to minimize the risk factors by using various hedging techniques. For example, a trader trading on behalf of a financial institution may engage in numerous transactions that each require the trader to pay out a certain sum of U.S. dollars at a future date. In order to eliminate the risk in the trader's book associated with the possible fluctuation of U.S. interest rates, the financial institution deposits in an interest bearing account an amount of U.S. dollars that will equal the total sum of U.S. dollars the trader is required to pay on the future date. In this way, the interest rate risk associated with the trader's positions is removed from the trader's book and is carried by the financial institution. The financial institution performs a similar hedging transaction for all its traders so that the total interest rate risk generated by trading on behalf of the financial institution is aggregated in a single interest rate risk book. The financial institution may then engage in additional transactions to hedge the risk associated with the interest rate book.

The typical procedure used to hedge the risk associated with a trader's book is to "net out" the trader's positions per instrument class and hedge the risks associated with each instrument class. So, for example, if the trader has five FX forward positions in which the trader must deliver a total of $120M US by January 27$^{th}$, a hedging transaction is performed in which the financial institution deposits into a money market account a sufficient amount US dollars so that $120M US is available by January 27$^{th}$. Thus, the trader's entire interest rate risk associated with the trader's FX forward positions is transferred to the financial institution's interest rate risk book. Similarly, the risks on the trader's book associated with other instrument classes, such as, for example, swaps and money markets, are hedged and transferred to the risk books of the financial institution.

Several inefficiencies exist with hedging a trader's book in this manner. First, the process of netting all a trader's positions in a particular instrument class, for example FX forward contracts, to determine the trader's interest rate risk in US dollars ignores the different FX risks that may be associated with each FX forward contract. For instance, the trader's FX forward positions may include US/CHF and US/JPY forwards that each present a different FX risk. While netting all the trader's FX forward contracts is useful in hedging the trader's US interest rate risk, it does not account for the trader's FX risks associated with the US/CHF and US/JPY exchange rates.

Furthermore, because the netting of the trader's book and the transfer of the risk on the trader's book to the financial institution's risk book occurs periodically, perhaps once a week, the hedge at the end the period reflects the risks at the time of the hedge but may not accurately reflect the risks that existed at the time of the trade. For example, if the interest rate risk associated with a trader's FX forward contracts are netted and hedged once a week, then any hedging transaction at the end of the week may not precisely hedge the interest rate risk of each FX forward contract if interest rates varied during the week. Such imprecise hedging may expose the financial institution to significant risks, especially as the number of transactions to be hedged increases.

Accordingly, it is desirable to provide a method and system for precisely hedging the risks associated with financial transactions.

SUMMARY OF THE INVENTION

The present invention is directed to overcoming the drawbacks of the prior art. Under the present invention, a method is provided for managing risk associated with at least one financial transaction wherein each of the at least one financial transactions have at least a first risk factor and a second risk factor. The method includes a first step of receiving one of the at least one financial transactions. Next, in a second step, the first risk factor is transferred to a first risk book. In a third step, the second risk factor is then transferred to a second risk book. Next, in a fourth step, another of the at least one financial transactions is received. Finally, the second through fourth steps are repeated for each of the at least one financial transactions.

In an exemplary embodiment, the first risk factor is an interest rate risk, the first risk book is an interest rate risk book, the second risk factor is an FX risk and the second risk book is an FX risk book.

In another exemplary embodiment, one of said at least one financial transactions has a third risk factor and the third risk factor is transferred to a third risk book.

In yet another exemplary embodiment, one of the at least one financial transactions has a fourth risk factor and the fourth risk factor is transferred to a fourth risk book.

In still yet another exemplary embodiment, the third risk factor is a collateral risk, the third risk book is a collateral risk book, the fourth risk factor is a volatility risk and the fourth risk book is a volatility risk book.

In an exemplary embodiment, the first risk factor is an interest rate risk, the first risk book is an interest rate risk book, the second risk factor is a collateral risk, the second risk book is a collateral risk book, the third risk factor is a volatility risk and the third risk book is a volatility risk book.

In another exemplary embodiment, the first risk factor is an interest rate risk, the first risk book is an interest rate risk book, the second risk factor is a volatility risk, the second risk book is a volatility risk book, the third risk factor is an FX risk and the third risk book is an FX risk book.

In yet another exemplary embodiment, the first risk factor is an FX risk, the first risk a book is an FX risk book, the second risk factor is a collateral risk, the second risk book is a collateral risk book, the third risk factor is a volatility risk and the third risk book is a volatility risk book.

In still yet another exemplary embodiment, one of the at least one financial transaction is an FX forward contract between a first currency and a second currency having a delivery date, and includes the steps of borrowing money in the first currency to be payable on the delivery date, depositing money in the second currency to be received on the delivery date and executing a spot transaction between the first currency and the second currency.

In an exemplary embodiment, one of the at least one financial transactions is a gold lease having a delivery date and providing periodic interest payments in a first currency and includes the steps of executing a zero-coupon gold deposit to be payable on the delivery date, executing a note being due on the delivery date, the note requiring periodic interest payments to be made in the first currency, executing a zero-coupon loan in the first currency to be paid on the delivery date and executing a spot transaction between said first currency and a second currency.

In another exemplary embodiment, the first risk factor included in the first risk book and the second risk factor included in the second risk book are hedged.

In yet another exemplary embodiment, the third risk factor included in the third risk book and the fourth risk factor included in the fourth risk book are hedged.

Under the present invention, a system for managing risk is provided and includes at least one trader book, the at least one trader book including a plurality of transactions wherein each of the plurality of financial transactions has a first risk factor and a second risk factor. Also included is at least a first risk book and a second risk book. A risk stripping module being in communications with the at least one trader book and with the first risk book and second risk book is included. When the risk stripping module receives each of the plurality of transactions, the risk stripping module executes a first hedging transaction for transferring the first risk factor to the first risk book and a second hedging transaction for transferring the second risk factor to the second risk book.

Accordingly, a method and system is provided for precisely hedging the risks associated with financial transactions.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
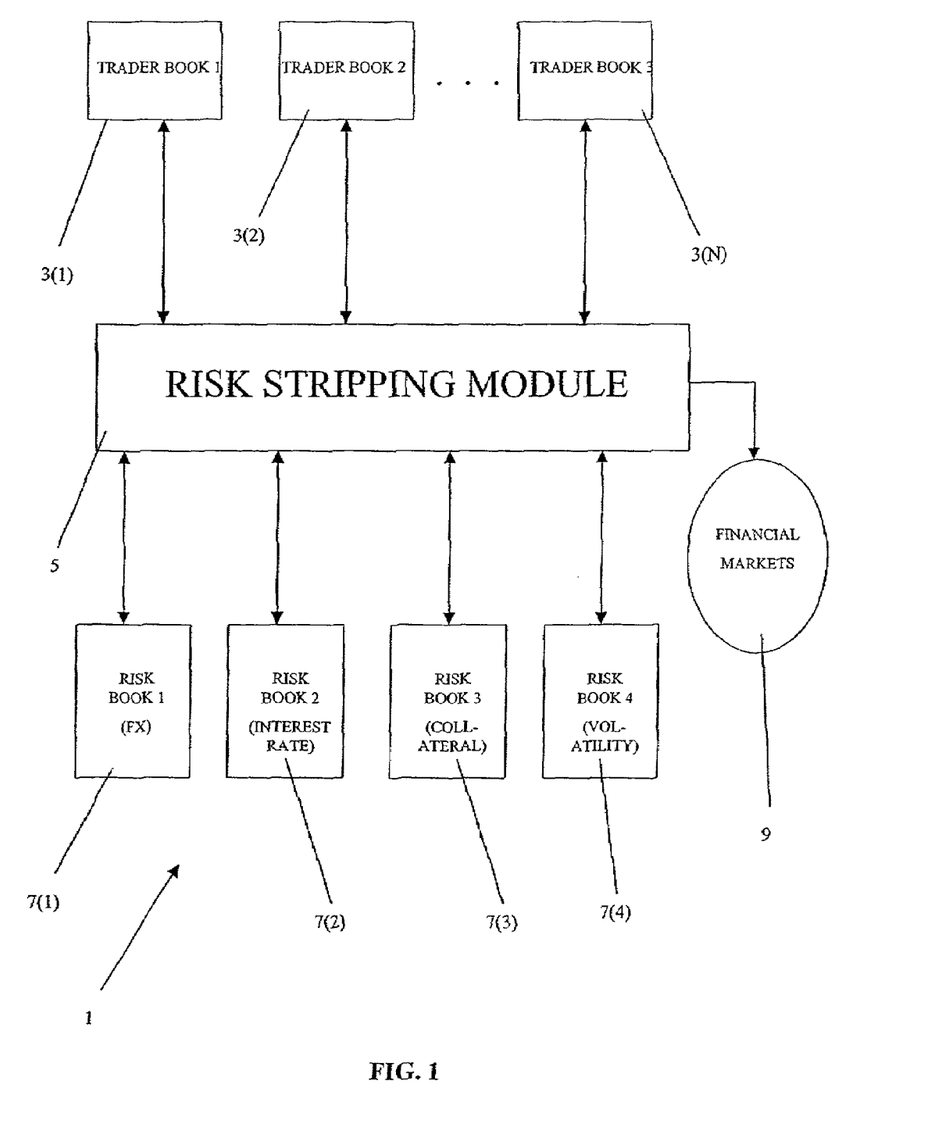
FIG. 1 is a system for managing the risk associated with a plurality of financial transactions, in accordance with the present invention.

Referring now to FIG. 1, there is shown a system 1 for managing the risk associated with a plurality of financial transactions, in accordance with the present invention. System 1 includes a plurality of trader books 3 each containing a plurality of financial transactions the particular trader has executed on behalf of a financial institution. Trader books 3 may be any device capable of receiving, storing and transmitting financial transactions including, by way of non-limiting example, a personal computer executing software according to well-known techniques. Each of the financial transactions in trader books 3 may have associated therewith any of a plurality of risk factors including, by way of non-limiting example, an interest rate risk factor, an FX risk factor, a volatility risk factor and a collateral risk factor.

System 1 also includes a risk stripping module 5 that receives each of the plurality of financial transactions from each of the trader books 3 and separates out from each of the plurality of transactions the different risk factor types using hedging transactions. Risk stripping module 5 may be, by way of non-limiting example, a personal computer that executes software, designed using well-known techniques, to receive financial transactions from trader books 3 and to interface with financial markets 9 for performing the required hedging transactions. For each financial transaction, risk stripping module 5 performs at least one hedging transaction, via access to financial markets 9, that removes from the trader's book a first risk factor associated with the particular financial transaction. Risk stripping module 5 then performs a second of hedging transactions that removes from the financial transaction a second risk factor. In an exemplary embodiment, risk stripping module 5 performs a third and fourth hedging transaction to remove a third and fourth risk factor from the particular transaction.

The process of removing the various risk factors associated with financial transactions included in traders' books 3 necessarily creates other risks. For example, the hedging transactions used to strip out the interest rate risk factor and FX risk factor, as in the example described below, necessarily creates additional interest rate risks and FX risks. These risks, however, are tied to the different hedging transactions used to strip out the various risk factors so these different risk factors may then be separated and aggregated. Thus, while the original financial transaction may include both and interest rate and FX risks, after the hedging transactions each of the risk factors are associated only with a related hedging transaction.

Risk stripping module 5 then assigns the hedging transactions to one of a plurality of risk books 7. In an exemplary embodiment, risk books 7 include an FX risk book 7(1), an interest rate risk book 7(2) a collateral risk book 7(3) and a volatility risk book 7(4). In another exemplary embodiment, additional risk books may be included such as, by way of non-limiting example, a basis risk book and a credit risk book. Furthermore, any of risk books 7 may be further subdivided—fir example, volatility risk book 7(4) may be subdivided into an interest-rate volatility book, an FX volatility book and a bond volatility book. Risk books 7 may be, by way of non-limiting example, a personal computer that executes software, designed using well-known techniques, to receive hedging transactions from risk stripping module 5. Risk stripping module then assigns each hedging transaction to the particular one of risk books 7 associated with the risk the particular hedging transaction stripped. Consequently, each one of risk books 7 aggregates hedging transactions that only include a risk factor associated with that particular risk book. Subsequently, the financial institution may execute further hedging transactions, using well-known techniques, to hedge the risks associated with each of risk books 7. Thus, risk stripping module 5 removes the risk associated with financial transactions on traders' books 3 and transfers those risks to a corresponding one of risk books 7.

Figure 2:
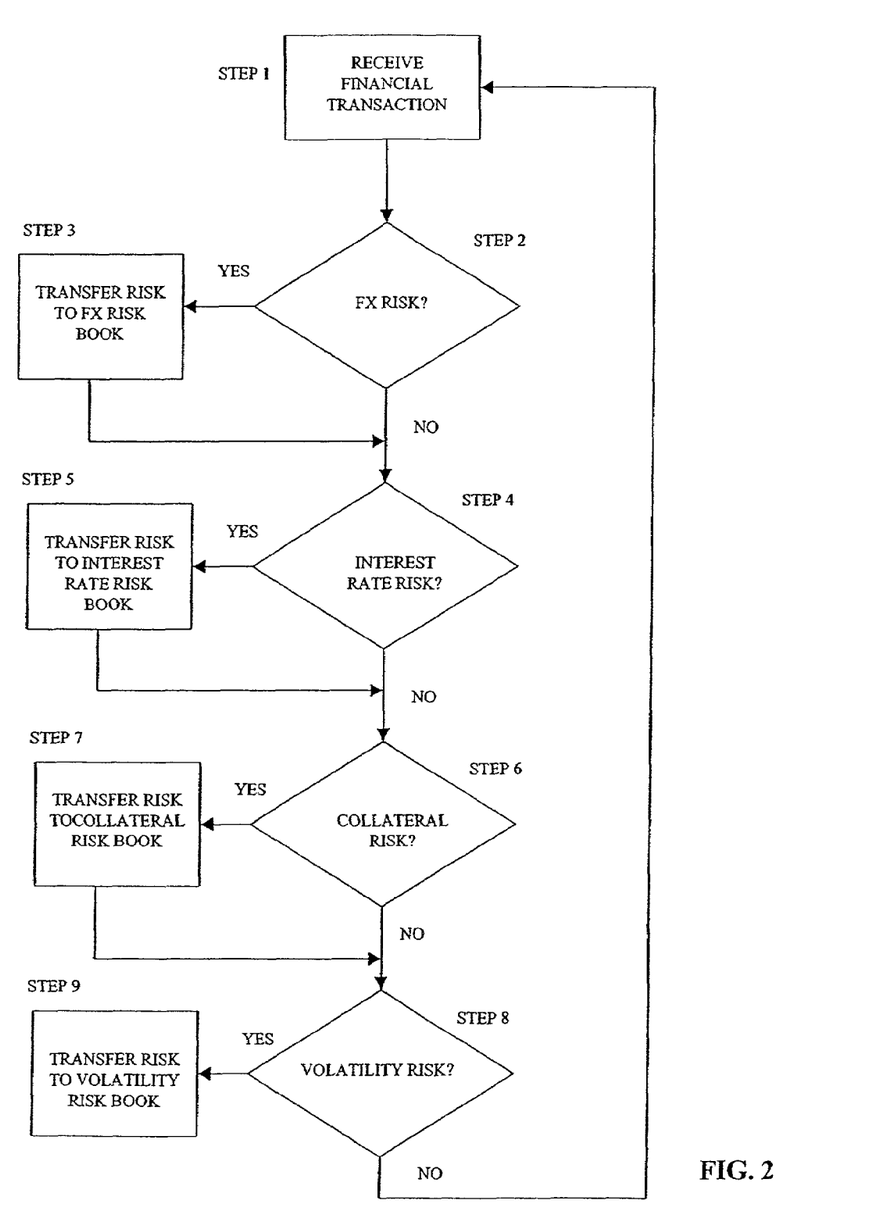
FIG. 2 is a flowchart describing the hedging activity performed by the system of FIG. 1.

Referring now to FIG. 2, there is shown a flowchart describing the hedging activity performed by risk stripping module 5. Initially, in Step 1, risk stripping module 5 receives a financial transaction from one of trader books 3. In Step 2, it is determined whether the particular financial transaction includes an FX risk component. Financial transactions that have an FX risk component include, by way of non-limiting example, FX forward contracts and FX spot transactions. If the particular financial transaction includes an FX risk, then in Step 3, risk stripping module 5 executes an FX risk hedging transaction for transferring that FX risk to FX risk book 7(1). Next, in Step 4, it is determined whether the particular financial transaction includes an interest rate risk component. Financial transactions that have an interest rate risk component include, by way of non-limiting example, include FX forward contracts and money-market transactions. If the particular financial transaction includes an interest rate risk, then in Step 5, risk stripping module 5 executes an interest rate hedging transaction for transferring that interest rate risk to interest rate risk book 7(2). Next, in Step 6, it is determined whether the particular financial transaction includes a collateral risk component. Financial transactions that have a collateral risk component include, by way of non-limiting example, a gold lease. If the particular financial transaction includes a collateral risk, then in Step 7, risk stripping module 5 executes a collateral risk hedging transaction for transferring that collateral risk to collateral risk book 7(3). Next, in Step 8, it is determined whether the particular financial transaction includes a volatility risk component. Financial transactions that have a volatility risk component include, by way of non-limiting example, options, options on interest-rate futures, futures, call money transactions and any type of transaction containing an implied optionality. If the particular financial transaction includes a volatility risk, then in Step 9, risk stripping module 5 executes a volatility risk hedging transaction for transferring that volatility risk to volatility risk book 7(3).

Figure 3:
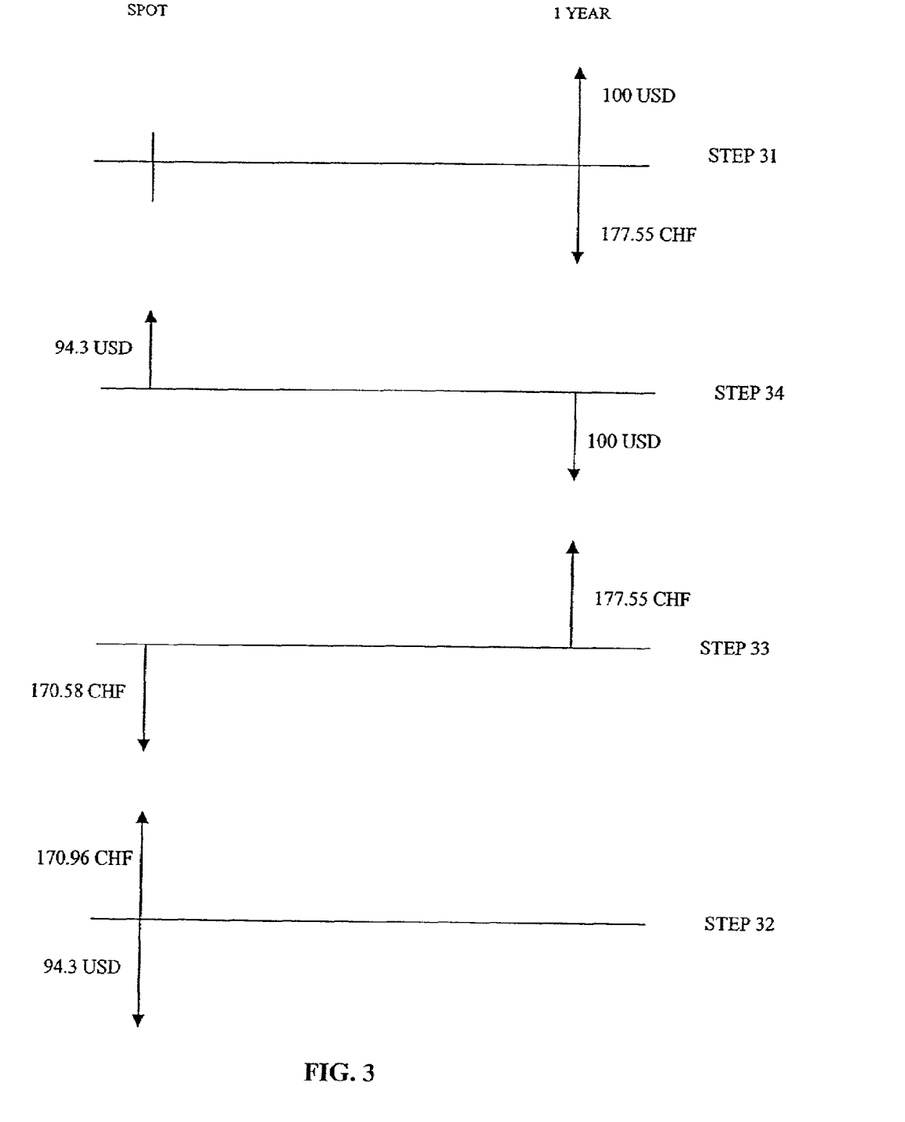
FIG. 3 is a series of graphs illustrating the application of the present invention to a one-year 100 USD/CHF FX forward transaction.

Referring now to FIG. 3, there is shown a series of graphs that illustrate the risk stripping techniques of the present invention as applied to a one-year 100 USD/CHF FX forward transaction. Under the terms of the transaction, in this example, the financial institution will exchange 177.55 CHF for 100 USD in one year, as shown in Step 31. In order to remove the FX and interest rate risks associated with the FX forward transaction, initially, in Step 32, risk stripping module 5 causes a spot transaction to occur in which 94.3 USD is sold for 170.96 CHF based on a spot transfer rate of, for illustrative purposes, 1.81. Next, in Step 33, a money market deposit transaction is executed by risk stripping module 5 in which 170.58 CHF, taken from the 170.96 CHF received in Step 32, is deposited at a transfer rate of 4.08% and which therefore yields 177.55 CHF in one year. In Step 34, a money market loan transaction is executed by risk stripping module 5 in which 94.3 USD is borrowed at a rate of 6.045% and that incurs a repayment obligation of 100 USD in one year. Netting the transactions executed by risk stripping module 5 both at spot and in one year, the entire interest rate risk and FX risk is removed from the trader's FX forward transaction and the trader is left with a net position of +0.38 CHF at spot.

After the risk stripping technique is applied to remove the interest rate and FX risks from the trader's book, there remains an interest rate risk associated with the money market deposit transaction in Step 34 and the money market loan transaction in Step 33. This interest rate risk is then assigned to interest rate risk book 7(2) that aggregates all the interest rate risks that are stripped out of trader transactions. The financial institution then performs further hedging transactions to hedge the interest rate risk contained in interest rate risk book 7(2) using known hedging techniques. In addition, there remains an FX risk associated with the transaction of Step 33. This FX risk is then assigned to FX risk book 7(1) that aggregates all the FX risks that are stripped out of trader transactions. Here too the financial institution may then perform further hedging transactions to hedge the FX risk contained in FX risk book 7(1) using known hedging techniques.

Figure 4A:
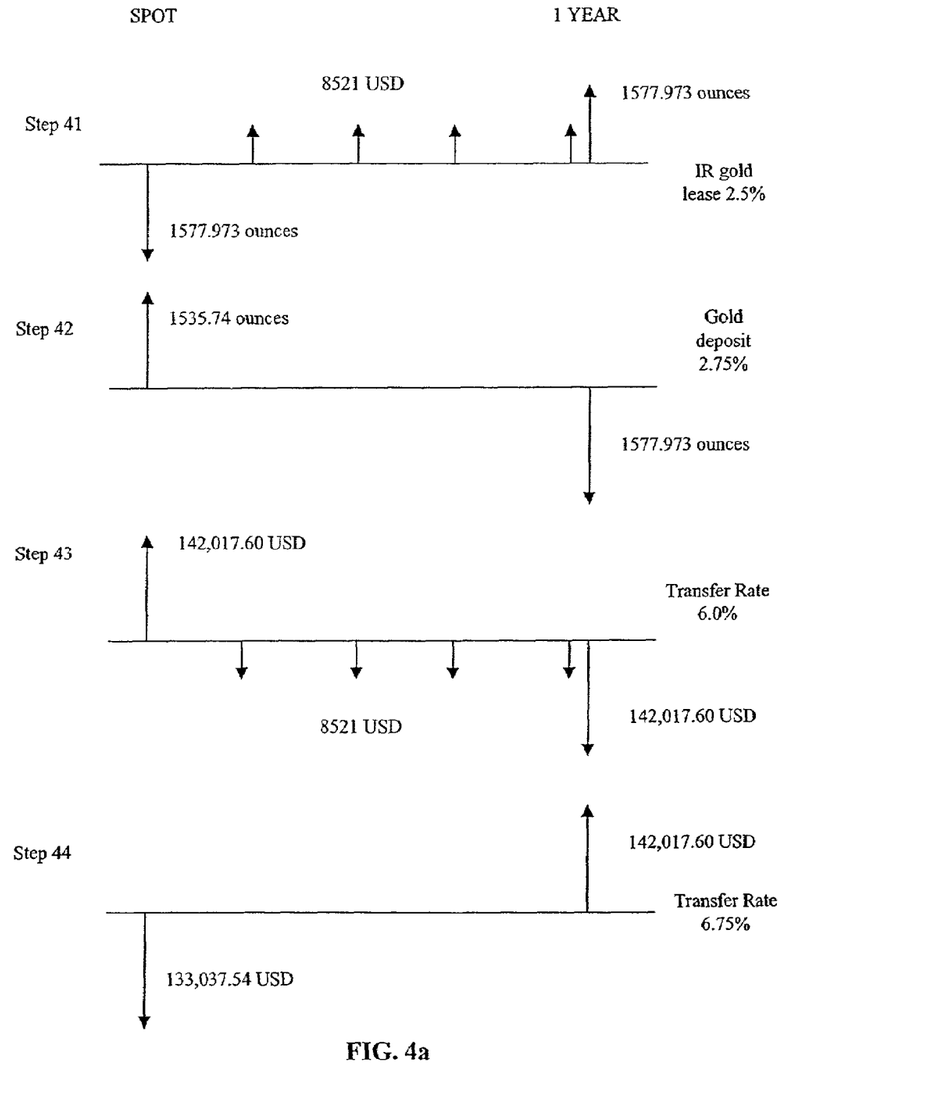
FIG. 4 is a series of graphs illustrating the application of the present invention to a one-year gold lease transaction.
Figure 4B:
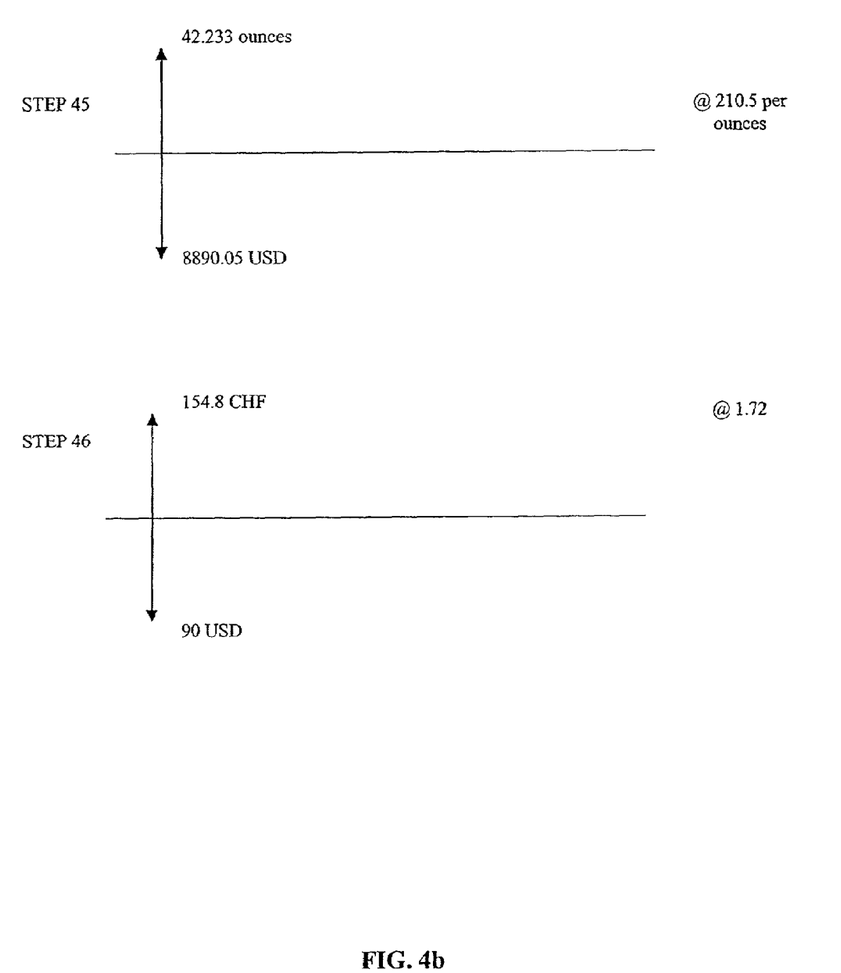

Referring now to FIG. 4, there is shown a series of graphs that illustrate the risk stripping techniques of the present invention as applied to a one-year gold lease transaction. Initially, in Step 41, a financial institution enters into a gold lease in which the financial institution deposits 1577.973 ounces of gold to a client for one year for which the financial institution receives interest payments every three months at a rate of 2.5% (for a total of 8521 USD) and also receives 1577.973 ounces of gold in one year. The gold lease transaction includes three distinct risk factors. A first risk factor is a collateral risk deriving from the possibility that the client won't return the deposited gold to the financial institution at the end of the year. A second risk factor is an interest rate risk based on the possibility that prevailing interest rates may rise after the gold lease transaction is executed in which case the quarterly interest payments the financial institution receives will be below market rate. A third risk factor is a currency risk that arises if, for example, the financial institution is Swiss and desires to convert the interest payments received in USD into CHF. Using the method of the present invention, as will be described below, each of these risk factors are stripped out from the trader book that is holding the gold lease transaction and the risk factors are transferred to the appropriate risk book maintained by the financial institution.

In order to remove the collateral risk associated with the gold lease transaction, in Step 42 a zero-coupon gold deposit is executed by risk stripping module 5 in which the financial institution borrows 1535.74 ounces of gold at spot at a rate of 2.75% and repays 1577.973 ounces of currency gold in one year. Next, in Step 43, a note is executed by risk stripping module 5 in which 142,017.60 USD is borrowed at a transfer rate of 6.0% and in which quarterly interest payments in USD (a total of 8521 USD) are made and a repayment obligation of 142,017.60 USD accrues in one year. Next, in Step 44, a zero-coupon loan is executed by risk stripping module 5 in which 133,037.54 USD is deposited at a transfer rate of 6.75% and which therefore yields 142,017.60 USD in one year. Netting the transactions executed by risk stripping module 5 at spot, quarterly and at one year, the collateral risk and the interest rate risk are removed from the trader's gold lease transaction and the trader is left with a long position of 8980.05 USD and a short position of 42.233 ounces of gold.

Next, is Step 45, 42.233 ounces of gold (at 210.50 per ounce) is bought for 8890.05 USD at spot. Finally, in Step 46, the remaining FX risk is removed by selling 90 USD for 154.80 CHF at spot. The result of these spot transactions is a net position of 154.8 CHF at spot.

As in the example of FIG. 3, the risk stripping transactions executed by risk stripping module 5 each have associated therewith a particular risk factor and each risk stripping transaction is assigned to one of risk books 7 according to the associated risk factor. At that point, the financial institution then performs further hedging transactions to hedge the collateral, interest rate and FX risks contained in collateral risk book 7(3), interest rate risk book 7(2) and FX risk book 7(1), respectively.

Accordingly, by performing the risk stripping method of the present invention, the individual risk factors associated with each financial transaction performed by a trader are removed from the trader's book and are transferred to a corresponding risk book maintained by the financial institution. By aggregating risk factors of the same type into a single risk book, the financial institution may then precisely hedge the aggregated risk of each risk type for all the transactions performed by traders of the financial institution.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. An automated method for managing risk associated with a plurality of financial positions, comprising:
   for each of the plurality of financial positions:
   receiving information indicating entry into the financial position, the financial position having at least one risk factor; and
   automatically performing at least one hedging transaction at substantially the same time as the financial position is entered, the at least one hedging transaction removing the at least one risk factor from the financial position.

2. The method of claim 1 further comprising:
   assigning the at least one hedging transaction to a risk book associated with the at least one risk factor removed from the financial position.

3. The method of claim 2, wherein the at least one hedging transaction removes an interest rate risk from the financial position, the method further comprises assigning the at least one hedging transaction to an interest rate risk book.

4. The method of claim 2, wherein the at least one hedging transaction removes an FX risk from the financial position, the method further comprises assigning the at least one hedging transaction to an FX risk book.

5. An automated method for managing risk associated with a plurality of financial positions, comprising:
   for each of a plurality of financial positions:
   receiving information indicating entry into the financial position, the financial position having a plurality of risk factors; and
   automatically performing a plurality of hedging transactions at substantially the same time as the financial position is entered, each of the plurality of hedging transactions removing a respective one of the plurality of risk factors from the financial position.

6. The method of claim 5 further comprising:
   assigning each of the plurality of hedging transactions to a risk book associated with the risk factor removed from the financial position by the corresponding hedging transaction.

7. The method of claim 6, wherein at least one of the plurality of hedging transactions removes an interest rate risk from the financial position, the method further comprises assigning that hedging transaction to an interest rate risk book.

8. The method of claim 6, wherein at least one of the plurality of hedging transactions removes an FX risk from the financial position, the method further comprises assigning that hedging transaction to an FX risk book.

9. The method of claim 6, wherein at least one of the plurality of hedging transactions removes a collateral risk from the financial position, the method further comprises assigning that hedging transaction to a collateral risk book.

10. The method of claim 6, wherein at least one of the plurality of hedging transactions removes a volatility risk from the financial position, the method further comprises assigning that hedging transaction to a volatility risk book.

11. The method of claim 5, wherein at least one of the plurality of financial positions results from entry into an FX forward contract between a first currency and a second currency, said FX forward contract having a delivery date, the method further comprising:
    automatically performing a first hedging transaction to remove an interest rate risk from the financial position, the first hedging transaction comprising:
       borrowing money in said first currency through a money market loan transaction to be payable on said delivery date; and
       depositing money in said second currency through a money market deposit transaction to be received on said delivery date; and
    automatically performing a second hedging transaction to remove an FX risk from the financial position, the second hedging transaction comprising the step of executing a spot transaction between said first currency and said second currency.

12. The method of claim 5, wherein at least one of the plurality of financial positions results from entry into a gold lease having a delivery date and providing periodic interest payments in a first currency, the method further comprising:
    automatically performing a first hedging transaction to remove a collateral risk from the financial position, the first hedging transaction comprising executing a zero-coupon gold deposit to be payable on said delivery date;
    automatically performing a second hedging transaction to remove an interest rate risk from the financial position, the second hedging transaction comprising the steps of:
       executing a note being due on said delivery date, said note requiring periodic interest payments to be made in said first currency; and
       executing a zero-coupon loan in said first currency to be paid on said delivery date;
    automatically performing a third hedging transaction to remove an FX risk from the financial position, the third hedging transaction comprising the step of executing a spot transaction between said first currency and a second currency.

13. A system for managing risk of a plurality of financial positions, comprising:

a risk stripping module in communication with a plurality of trader books;

for each of a plurality of financial positions, the risk stripping module receiving information indicating entry into the financial position, the financial position having at least one risk factor from a corresponding one of the plurality of trader books, and automatically performing at least one hedging transaction at substantially the same time as the financial position is entered, the at least one hedging transaction removing the at least one risk factor from the financial position where in said module is encoded on a computer readable medium.

14. The system of claim 13 further comprising:

a plurality of risk books, each of the plurality of risk books corresponding to a different risk factor;

the risk stripping module assigning the at least one hedging transaction to one of the plurality of risk books that is associated with the risk factor removed from the financial position.

15. The system of claim 14, wherein the at least one hedging transaction removes an interest rate risk from the financial position, the system further comprises the risk stripping module assigning the at least one hedging transaction to an interest rate risk book.

16. The system of claim 14, wherein the at least one hedging transaction removes an FX risk from the financial position, the system further comprises the risk stripping module assigning the at least one hedging transaction to an FX risk book.

17. A system for managing risk of a plurality of financial positions, the system comprising:

a risk stripping module in communication with a plurality of trader books;

for each of a plurality of financial positions, the risk stripping module receiving information indicating entry into the financial position, the financial position having a plurality of risk factors from a corresponding one of the plurality of trader books, and automatically performing a plurality of hedging transactions at substantially the same time as the financial position is entered, each of the plurality of hedging transactions removing a respective one of the plurality of risk factors from the financial position where in said module is encoded on a computer readable medium.

18. The system of claim 17 further comprising:

a plurality of risk books, each of the plurality of risk books corresponding to a different risk factor;

the risk stripping module assigning each of the plurality of hedging transaction to one of the plurality of risk books that is associated with the risk factor removed from the financial position by the corresponding hedging transaction.

19. The system of claim 18, wherein at least one of the plurality of hedging transactions removes an interest rate risk from the financial position, the system further comprises the risk stripping module assigning that hedging transaction to an interest rate risk book.

20. The system of claim 18, wherein at least one of the plurality of hedging transactions removes an FX risk from the financial position, the system further comprises the risk stripping module assigning that hedging transaction to an FX risk book.

21. The system of claim 18, wherein at least one of the plurality of hedging transactions removes a collateral risk from the financial position, the system further comprises the risk stripping module assigning that hedging transaction to a collateral risk book.

22. The system of claim 18, wherein at least one of the plurality of hedging transactions removes a volatility risk from the financial position, the system further comprises the risk stripping module assigning that hedging transaction to the volatility risk book.

23. The system of claim 17, wherein:

at least one of the financial positions results from entry into an FX forward contract between a first currency and a second currency, said FX forward contract having a delivery date;

the risk stripping module automatically performing a first hedging transaction to remove an interest rate risk from the financial position, the first hedging transaction comprising the steps of:

borrowing money in said first currency through a money market loan transaction to be payable on said delivery date; and depositing money in said second currency through a money market deposit transaction to be received on said delivery date; and the risk stripping module automatically performing a second hedging transaction to remove an FX risk from the financial position, the second hedging transaction comprising the step of executing a spot transaction between said first currency and said second currency.

24. The system of claim 17, wherein:

at least one of the financial positions results from entry into a gold lease having a delivery date and providing periodic interest payments in a first currency;

the risk stripping module automatically performing a first hedging transaction to remove a collateral risk from the financial position, the second hedging transaction comprising the step of executing a zero-coupon gold deposit to be payable on said delivery date;

the risk stripping module automatically performing a second hedging transaction to remove an interest rate risk from the financial position, the second hedging transaction comprising the steps of:

executing a note being due on said delivery date, said note requiring periodic interest payments to be made in said first currency; and executing a zero-coupon loan in said first currency to be paid on said delivery date;

the risk stripping module automatically performing a third hedging transaction to remove an FX risk from the financial position, the third hedging transaction comprising the step of: executing a spot transaction between said first currency and a second currency.

* * * * *